March 6, 1928.
W. P. ZABEL
1,661,866
APPARATUS FOR CUTTING WIRE INTO LENGTHS
Filed June 20, 1927    3 Sheets-Sheet 1
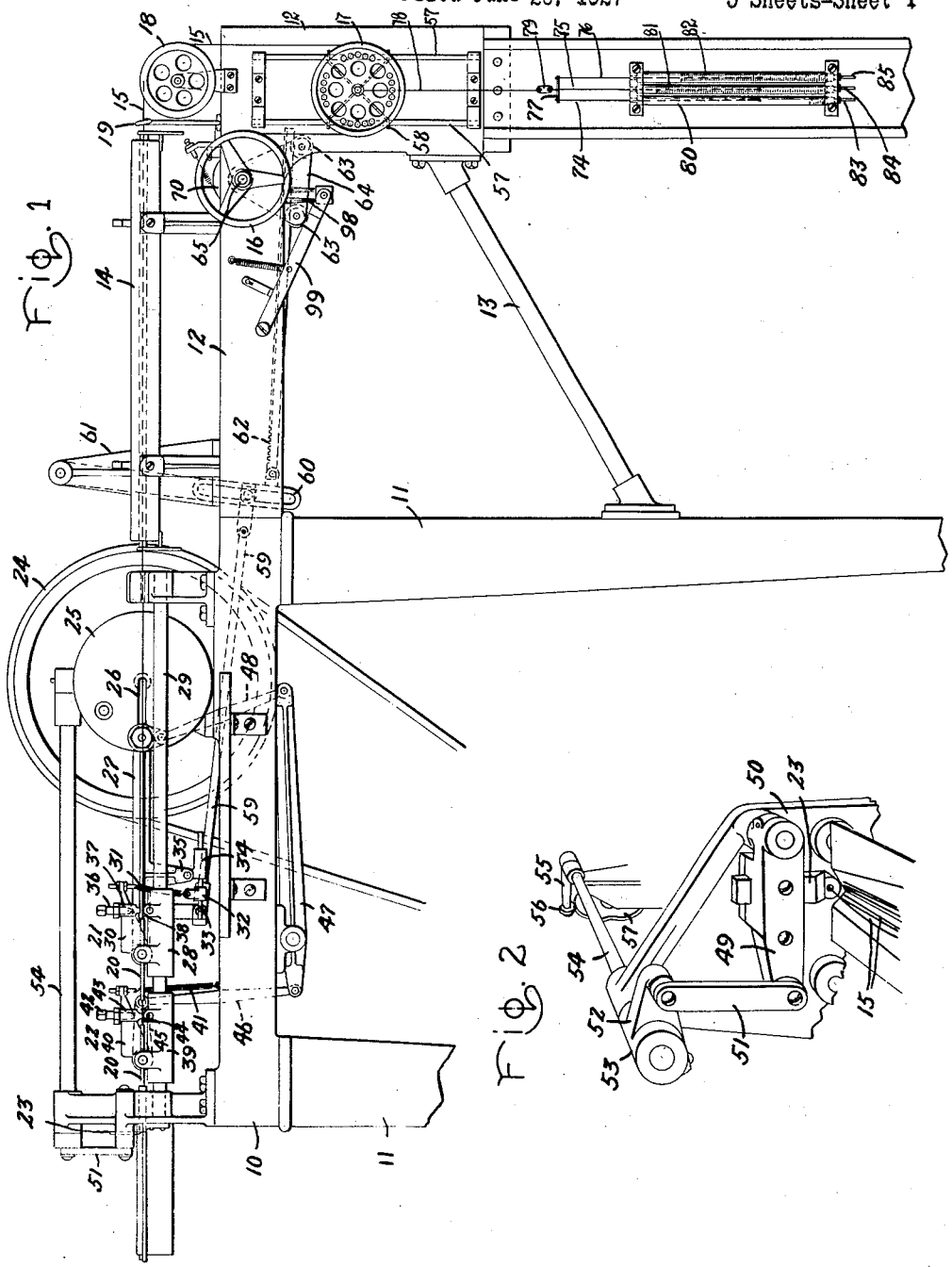
INVENTOR:
WILLIAM P. ZABEL,
BY
HIS ATTORNEY.

March 6, 1928.  
W. P. ZABEL  
1,661,866  
APPARATUS FOR CUTTING WIRE INTO LENGTHS  
Filed June 20, 1927  
3 Sheets-Sheet 2
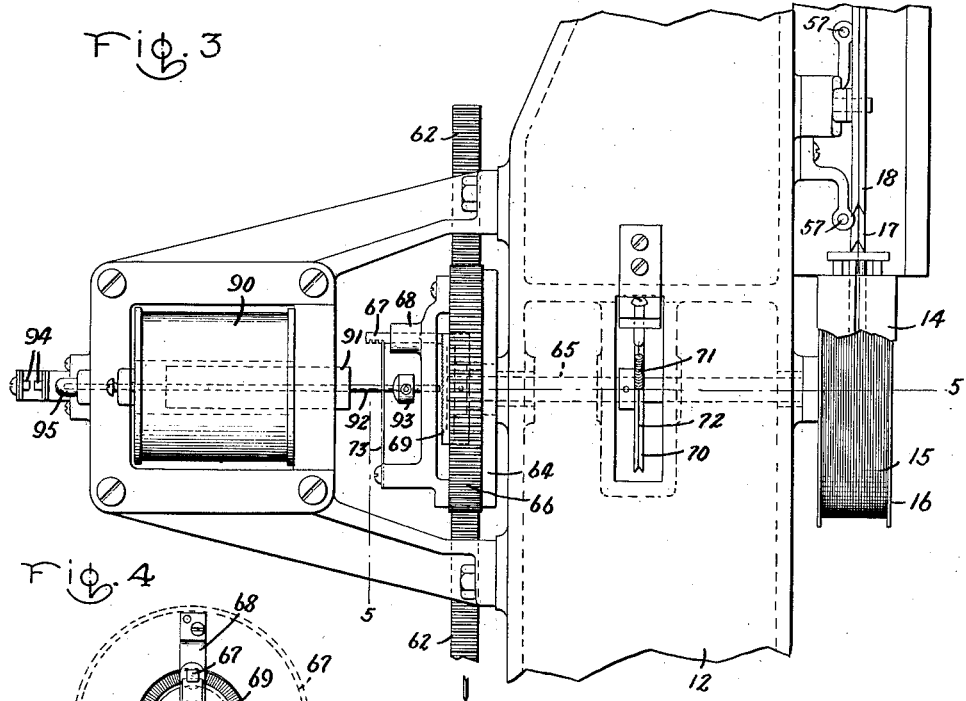
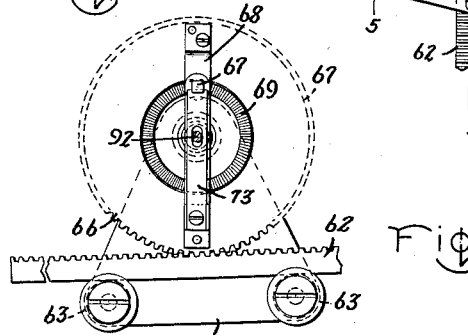
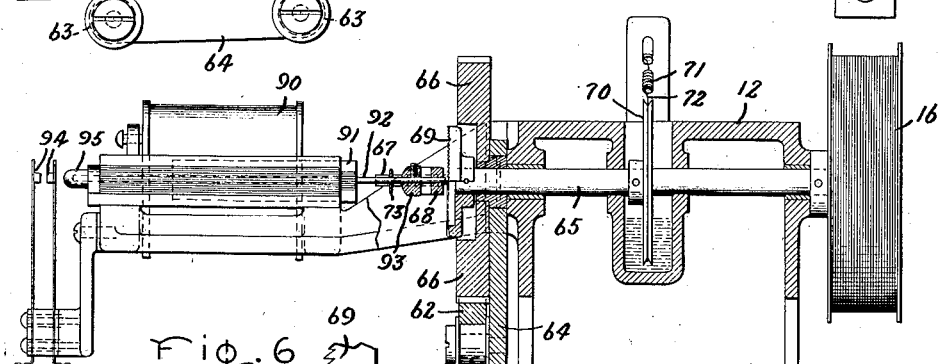
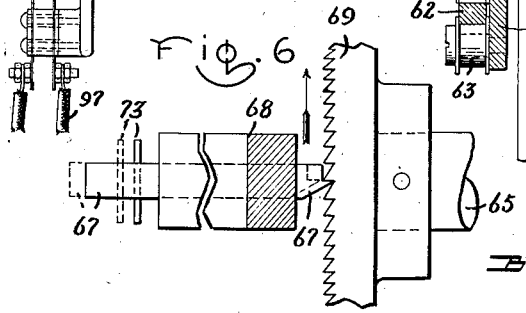
INVENTOR:  
WILLIAM P. ZABEL,  
BY  
HIS ATTORNEY.

March 6, 1928. 1,661,866
W. P. ZABEL
APPARATUS FOR CUTTING WIRE INTO LENGTHS
Filed June 20, 1927 3 Sheets-Sheet 3
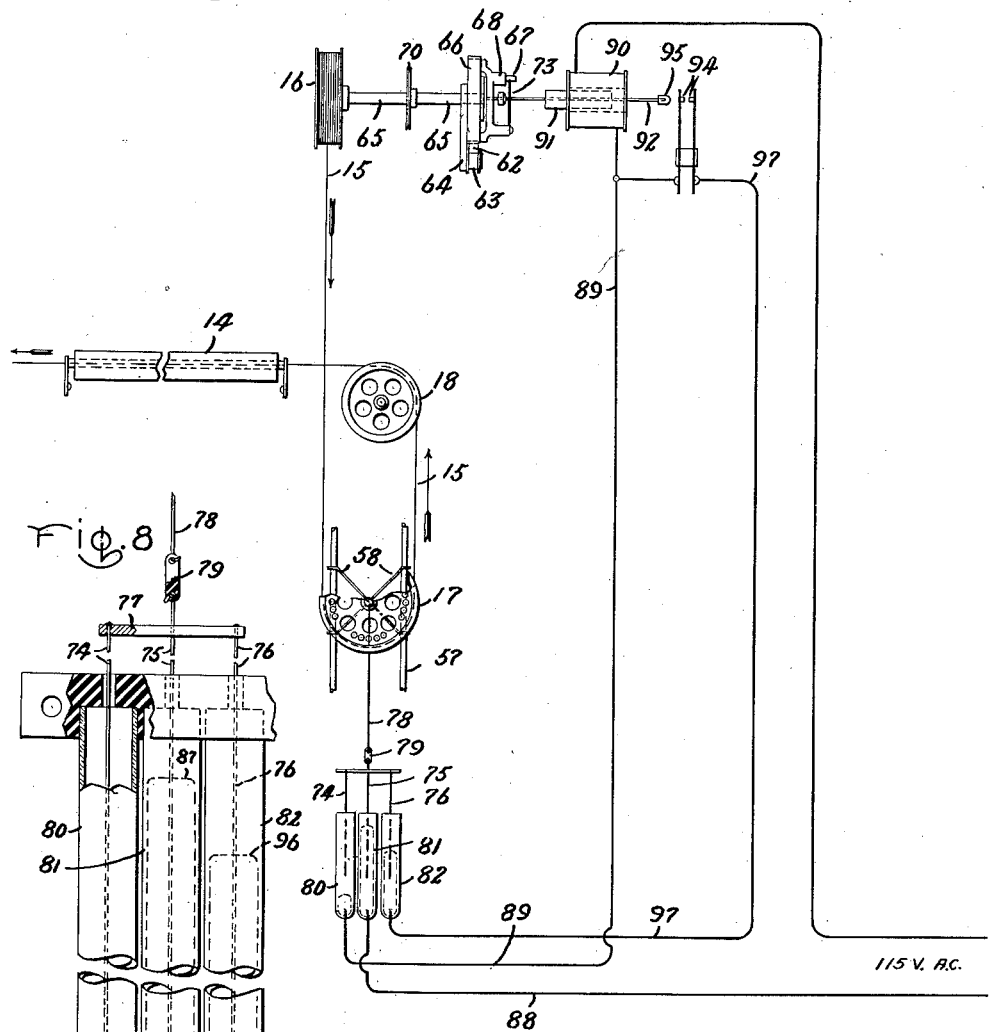
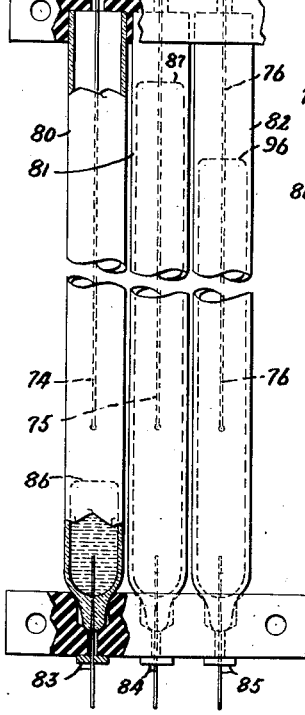
INVENTOR:
WILLIAM P. ZABEL,
BY
HIS ATTORNEY.

Patented Mar. 6, 1928.

1,661,866

UNITED STATES PATENT OFFICE.

WILLIAM P. ZABEL, OF CLEVELAND HEIGHTS, OHIO, ASSIGNOR TO GENERAL ELECTRIC COMPANY, A CORPORATION OF NEW YORK.

APPARATUS FOR CUTTING WIRE INTO LENGTHS.

Application filed June 20, 1927. Serial No. 199,898.

My invention relates to apparatus for cutting wire into lengths. Still more particularly, my invention relates to means for applying a uniform tension to the wire which is fed to the cutter. While capable of general application, my invention is particularly applicable to the cutting of filaments particularly coiled filaments for electric incandescent lamps and similar articles. The principal object of my invention is to insure a uniform tension on the wire fed to the cutter.

In the manufacture of coiled filaments for incandescent lamps and similar devices it has been customary to coil the filament wire, usually tungsten, on a mandrel wire such as brass or steel. This composite wire is then passed through a measuring and cutting apparatus to be cut up into filament lengths. The mandrel is then dissolved out leaving the filament ready for mounting. The composite wire is usually carried on a reel from which it is fed to the cutting mechanism, and it is desirable in order to insure accuracy, that the wire be fed uniformly and under uniform tension so as to insure that it is straight. It has been the custom also to feed the wire through a heater which will heat the mandrel wire up to its annealing temperature so that it will straighten under comparatively slight tension. In order to get uniform results it is therefore desirable that the feed through the annealing heater should be uniform, and also that the tension be uniform because the mandrel wire after annealing is comparatively easy to stretch, and stretching of the mandrel wire will increase the separation of the coils of the filament wire and produce irregularities of filament lengths. The object of my invention is to insure uniform feeding and tension of the composite wire. Further features and advantages of my invention will appear from the description of a species thereof which follows.

In the drawing, Fig. 1 is a side elevation of a machine embodying my invention; Fig. 2 is a perspective view showing the cutting attachment; Fig. 3 is a plan showing the automatic control for the wire feed; Fig. 4 is an end elevation of a portion of the feed control mechanism; Fig. 5 is an elevation of the feed control mechanism which is partially in vertical section along the line 5—5 of Fig. 3; Fig. 6 is a fragmentary plan partially in section of a detail; Fig. 7 is a diagrammatic view showing the arrangement of parts including the electrical devices and circuits; and Fig. 8 is an elevation partially in section of a contacting member forming part of the electrical control.

Referring to Fig. 1, 10 is the bed plate of a coil cutting machine of the reciprocating push type which is in use at present. This is supported on standards 11. The tensioning mechanism is supported on a frame 12 which is L-shaped and is supported on the standards 11 by arm 13. This frame also supports the annealing heater 14 which is of a well-known type and, as shown, is electrically heated. The composite wire 15, consisting of a mandrel wire ordinarily of brass or steel having coiled thereon a filamentary wire such as tungsten, is carried on a reel 16. As the composite wire is fed from the reel, its path is downward under an extremely light disc 17 forming part of the tensioning mechanism hereinafter described. The wire then passes over an idler pulley 18 through eyelet 19, annealer tube 14 and through guide tubes 20 to the cutting mechanism. The wire is advanced intermittently toward the cutting mechanism by a feeding mechanism comprising a pair of grippers 21 and 22, the former being movable and the latter stationary. The arrangement is such that the gripper 21 engages the wire and moves it forward through the gripper 22 to the proper position with reference to the cutter 23. The gripper 21 is then moved back over the wire while the stationary gripper 22 engages the wire. On the next forward stroke the movable gripper engages the wire while the stationary gripper is released. The cutting mechanism works in synchronism with the grippers.

The cutting and feed mechanism is driven by the pulley 24 from a suitable source (not shown). Fixably mounted on the same shaft with the pulley 24 is the disc 25 which has a slot 26 in which is slidably mounted the end of the arm 27. The latter is pivotally attached to the block 28 of the gripper 21 which slides upon the stationary horizontal rods 29. Pivoted to the block 28 is another block 30, the other end thereof having attached thereto a spring 31. The other end of said spring is attached to an adjustable block 32 which is carried on a rod 33 slidably supported in the socket 34 pivotally mounted on a lug 35 carried by the arm 27. The pivoted block 30 carries an adjustable stop 36 which is located so as to be raised for a definite period by the arm 27. The said block 30 also carries the movable jaw 37 and the lower block 28 carries the stationary jaw 38. These serve to grip the composite wire 15 at certain periods in the stroke of the arm 27. After the arm 27 has been moved forward and has reached its furthest position to the left and as it starts backward to the right, it engages the stop 36 raising the pivoted block and the jaw 37 against the tension of the spring 31, and after it has reached its furthest position to the right and as it starts to the left, the arm 27 being in a lowered position thereby allows the spring 31 to force the jaw 37 into engagement with the wire. The stationary gripper 22 comprises a lower block 39 and has pivoted thereto the upper block 40, the other end of which has attached thereto a spring 41 attached to the bed plate 10. The upper block 40 carries the stop 42 and also has the jaws 43 and 44. The stop 42 is engaged by a rocker arm 45 which is pivoted at one end to the block 39 and has attached to the other end the rod 46 pivoted at its other end to one end of the lever arm 47. The latter is pivotally attached to the arm 48 which is also pivotally attached to the arm 27. The arrangement is such that as the arm 27 moves to the right, the jaws 43 and 44 close on the wire while the jaws 37 and 38 are open to permit the movable gripper to slide back over the wire. On the return movement of the arm 27, the jaws 43—44 are opened by the raising of the rocker arm 45 against the stop 42. The cutter comprises a blade 23 which is removably supported in a holder 49. The latter is pivotally supported at one end by the stationary frame 50 carried by the bed of the machine and has attached to the other end the actuating arm 51 pivotally supported on a lug 52 which projects from the sleeve 53 keyed on a shaft 54. An arm 55 attached to the shaft 54 carries a roller 56 which is actuated by a cam 57 mounted on the main driving shaft so that the cutter is actuated in synchronism with the wire feeding mechanism.

The reel 16 is actuated to feed the composite wire by a means which interrupts the feed whenever necessary to preserve the tension uniform. This tension is secured by means of the grooved disc 17 which is supported by the composite wire 15 and slides on vertical guide posts 57 through its guide rings 58 which engage said posts. The disc 17 lowers as the rate of feed from the reel 16 increases and rises as it decreases, and the rotation of the said reel is stopped or started when the disc reaches predetermined points.

The reel 16 is driven by the means shown principally in Figs. 1, 3, 4 and 5. The drive is in synchronism with the feed and cutting mechanism hereinbefore described. The connecting rod 59 is pivotally attached to the movable gripper block 21 and is adjustably mounted at its other end on the slotted arm 60 which is pivoted on a standard 61 supported on the farme 12. Also attached to the slotted arm 60 is the rack 62 which at its other end is supported on rollers 63 carried on a segment 64 rockably supported on the driving shaft 65 which carries the reel 16. The rack 62 engages the gear 66 and as it is reciprocated rotates the said gear back and forth.

When the composite wire is being advanced toward the cutting mechanism the rack 62 is moved forward thus causing a clockwise movement of the gear 66. During this time a spring pressed pawl 67 slidably mounted in a bearing 68 carried by the said gear is caused to engage a ratchet 69 attached to the end of the driving shaft 65 thereby rotating the reel 16 through the said shaft so as to unwind the composite wire. In order to prevent overthrow of the reel 16, a brake is provided comprising a grooved pulley 70 attached to the shaft 65 and partly submerged in oil. Surrounding the said pulley under tension of spring 71 is the string brake 72. The brake is constructed so as not to effect the positive feed of the composite wire from the reel 16. A flat steel spring 73 normally keeps the pawl engaged with the ratchet and the shape of the pawl is such as to allow it to slide over the teeth of the said ratchet during the counter clockwise movement of the gear 66 which occurs on the backward movement of the rack 62. The pawl is arranged to engage the ratchet long enough on the forward movement of the rack to unwind a trifle more wire than is required to be cut. This causes a gradual lowering of the disc 17. Suspending from the said disc is a short circuiting fork comprising three parallel conducting rods 74, 75 and 76 attached at their upper ends to a common conductor such as the bridge 77. This bridge is attached to the hub of the disc 17 through a wire 78 and insulated therefrom by the interposed insulator 79. Upon the lowering of the said disc the rods 74, 75 and 76 are caused to enter the tubes 80, 81 and 82 containing mercury columns of varying heights and each connected to the terminals 83, 84 and 85 such as shown in Fig. 8. When the disc 17 reaches a certain point in its downward travel, the rod 74 contacts with the mercury at 86 thereby establishing a circuit with the common conducting rod 75 which is always in contact with the mercury 87 and connected directly to one side of the line 88 through its terminal 84. Current will then flow through conductor 89 to a solenoid 90 which when energized withdraws its plunger 91. Upon the withdrawal of the said plunger, a rod 92 carried thereby and having a lug 93 attached thereto strikes against the flat spring 73 forcing it outward so as to cause the pawl 67 to become disengaged from the ratchet 69, thus stopping the rotation of the reel 16. At the same time a pair of auxiliary contacts 94 are closed by the insulated button 95 carried on the end of the rod 92 so as to maintain current through the solenoid during the raising of the short circuiting fork. The excess wire is quickly consumed by the machine under tension of the disc 17 and the said disc together with the short circuiting fork is then raised by the direct action of the cutting machine as it advances the wire. During the raising of the short circuiting fork the rod 74 immediately leaves the mercury column 86 thereby breaking the circuit but not cutting off the energy to the solenoid as the path of the current is now through the common conductor 75, bridge 77, rod 76, through the mercury column 96 where it passes through the terminal 85 and over the conductor 97 to the solenoid 90 through the auxiliary contacts 94 which are held closed by the insulated button 95. When the excess wire has been consumed the disc 17 has reached a point in its upward travel whereby the rod 76 leaves the mercury column 96 thereby cutting off the energy to the solenoid 90. The flat spring 73 is now free to force the pawl 67 back into engagement with the ratchet 69 and at the same time the spring contacts 94 are opened through pressure of the spring 73 on the lug 93 which pulls the button 95 away from the said contacts through the rod 92. The reel 16 is then rotated again and the cycle is repeated until all of the wire on the said reel is cut into lengths. In case the composite wire should break during the operation of the machine, the disc 17 would be released, thereby allowing the rod 74 to make contact with the mercury column 86, and as a result the solenoid 90 would be energized as before, thereby disconnecting the pawl and ratchet drive so as to stop further unwinding of the composite wire.

A brush 98 attached to the end of the spring tensioned lever 99 is caused to bear upon the composite wire within the flanges of the reel 16 to prevent the said wire from unwinding during the cutting operation and also at times when the said wire is accidentally released at its free end.

What I claim as new and desire to secure by Letters Patent of the United States is:

1. In an apparatus for cutting fine wire into lengths, the combination with a wire cutting means of a reel adapted to hold said wire, means for turning said reel to unwind said wire, means for intermittently advancing uniform lengths of said wire, intermediate means for applying a definite tension to the wire engaged by said advancing means, and means controlled by said tensioning means for controlling the operation of said reel turning means.

2. In an apparatus for cutting fine wire into lengths, the combination with a wire cutting means of a reel adapted to hold said wire, means for turning said reel to unwind said wire, means for intermittently advancing uniform lengths of said wire, intermediate means for applying a definite tension to the wire engaged by said advancing means, comprising a movable body supported by said wire, and means controlled by the movements of said body for controlling the operation of said reel turning means.

3. In an apparatus for cutting fine wires into lengths, the combination with a wire cutting means of a reel adapted to hold said wire, means for turning said reel to unwind said wire, means for intermittently advancing uniform lengths of said wire, intermediate means for applying a definite tension to the wire engaged by said advancing means comprising a movable body supported by said wire, and means comprising electrically moved parts and contact members controlled by the movements of said body for controlling the operation of said reel turning means.

4. In an apparatus for cutting fine wire into lengths, the combination of a wire cutting means, means for intermittently advancing uniform lengths of said wire to said wire cutting means, means for positively feeding wire to said advancing means, intermediate means for applying a definite tension to said wire comprising a movable body supported by said wire, and means controlled by the movements of said body for controlling the operation of said feeding means.

5. In an apparatus for cutting fine wire into lengths, the combination of a wire cutting means, means for intermittently advancing uniform lengths of said wire to said wire cutting means, means for positively feeding wire to said advancing means, intermediate means for applying a definite tension to said wire comprising a movable body supported by said wire and guides for causing said movable body to move in a definite path as the slack in said wire increases or decreases, and means controlled by the movements of said body for controlling the operation of said feeding means.

6. In an apparatus for cutting fine wire into lengths, the combination of a wire cutting means, means for intermittently advancing uniform lengths of said wire to said wire cutting means, means for positively feeding wire to said advancing means, intermediate means for applying a definite tension to said wire comprising a movable body supported by said wire and vertically disposed guides for causing said body to move in a definite path as the slack in said wire increases or decreases, and means controlled by the movements of said body for controlling the operation of said feeding means.

7. In an apparatus for cutting fine wire into lengths, the combination of a wire cutting means, means for intermittently advancing uniform lengths of said wire to said wire cutting means, means for positively feeding wire to said advancing means, intermediate means for applying a definite tension to said wire comprising a movable body supported by said wire and carrying electrical contacts and means comprising members adapted to be engaged by said contacts at definite points in their travel, and electrical means thereupon actuated for controlling the operation of said feeding means.

In witness whereof, I have hereunto set my hand this 16th day of June, 1927.

WILLIAM P. ZABEL.